(12) United States Patent
Nowling et al.

(10) Patent No.: US 7,389,798 B2
(45) Date of Patent: Jun. 24, 2008

(54) PLUG FOR A PORT

(75) Inventors: Michael D. Nowling, Clayton, IN (US); Rick D. Pelfrey, Indianapolis, IN (US)

(73) Assignee: SMC Corporation of America, Indianapolis, IN (US)

( * ) Notice: Subject to any disclaimer, the term of this patent is extended or adjusted under 35 U.S.C. 154(b) by 490 days.

(21) Appl. No.: 11/100,816

(22) Filed: Apr. 7, 2005

(65) Prior Publication Data
US 2005/0236596 A1 Oct. 27, 2005

Related U.S. Application Data

(60) Provisional application No. 60/560,630, filed on Apr. 8, 2004.

(51) Int. Cl.
*F16L 55/10* (2006.01)
(52) U.S. Cl. .............................. 138/89; 138/90; 285/921; 285/323; 285/243
(58) Field of Classification Search .................. 138/89, 138/90; 215/355, 364
See application file for complete search history.

(56) References Cited

U.S. PATENT DOCUMENTS

| | | | |
|---|---|---|---|
| 2,245,887 A * | 6/1941 | Wikander | 4/295 |
| 2,281,145 A * | 4/1942 | Stewart | 138/89 |
| 4,282,982 A * | 8/1981 | Nuesslein | 220/237 |
| 4,423,892 A * | 1/1984 | Bartholomew | 285/319 |
| 4,902,043 A * | 2/1990 | Zillig et al. | 285/4 |
| 4,915,136 A * | 4/1990 | Bartholomew | 138/89 |
| 5,230,539 A * | 7/1993 | Olson | 285/323 |
| 5,333,647 A | 8/1994 | Fukano et al. | |
| 5,459,953 A | 10/1995 | Fukano et al. | |
| 5,472,016 A * | 12/1995 | Szabo | 138/89 |
| 5,474,366 A * | 12/1995 | Strutt et al. | 300/21 |
| 5,486,025 A * | 1/1996 | Ketcham | 285/319 |
| 5,676,174 A * | 10/1997 | Berneski et al. | 138/89 |
| 5,725,255 A | 3/1998 | Hayashi et al. | |
| 6,003,557 A * | 12/1999 | Brelig et al. | 138/89 |
| 6,062,260 A | 5/2000 | Yoshimura et al. | |
| 6,131,610 A | 10/2000 | Morisako et al. | |
| 6,186,180 B1 * | 2/2001 | Moller et al. | 138/89 |
| 6,757,950 B2 * | 7/2004 | Malone | 29/235 |
| 2002/0163187 A1 | 11/2002 | Pelfrey et al. | |
| 2003/0226606 A1 | 12/2003 | Hayashi et al. | |
| 2004/0003850 A1 | 1/2004 | Miyazoe et al. | |

* cited by examiner

*Primary Examiner*—Patrick F Brinson
(74) *Attorney, Agent, or Firm*—Bose McKinney & Evans LLP

(57) ABSTRACT

A plug for a port is provided. Preferably, the plug and a cartridge configured to couple fluid tubes to a housing use substantially identical components such as a seal and a retainer or guide.

14 Claims, 6 Drawing Sheets

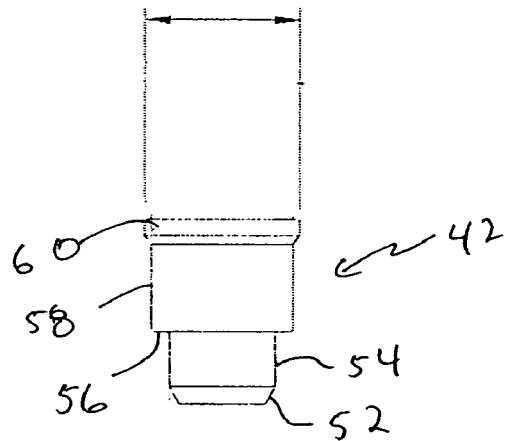
FIG. 3
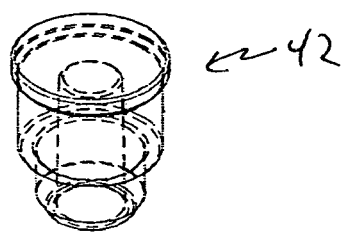
FIG. 5
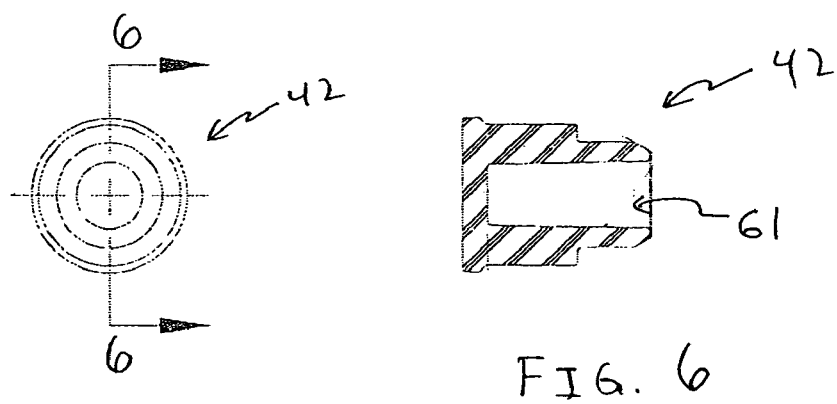
FIG. 4
FIG. 6

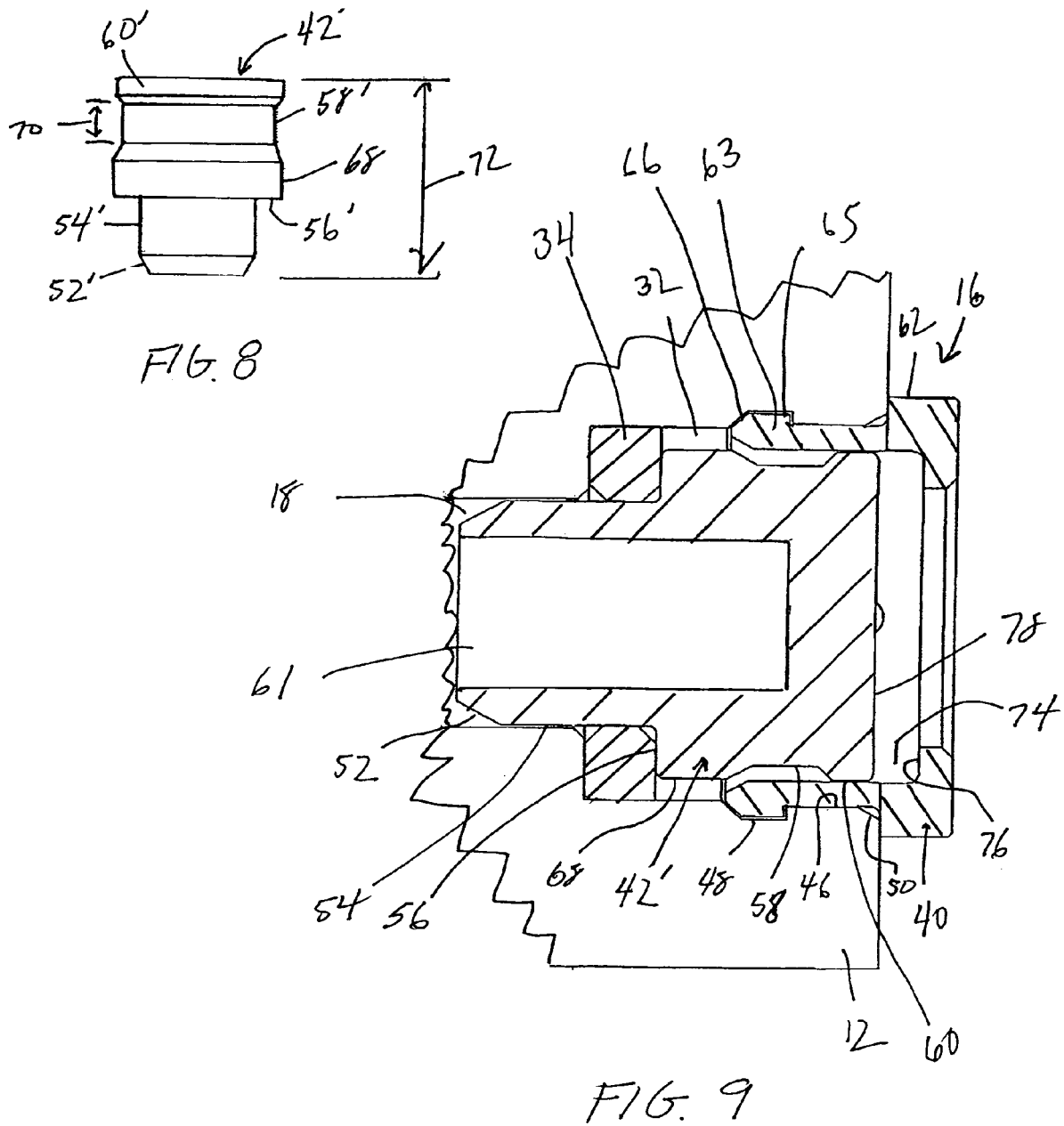

US 7,389,798 B2

PLUG FOR A PORT

CROSS-REFERENCE TO RELATED APPLICATION

This application claims benefit of U.S. Provisional Patent Application Ser. No. 60/560,630, filed Apr. 8, 2004, titled Plug for a Port, to Nowling et al., the disclosure of which is expressly incorporated by reference herein.

BACKGROUND AND SUMMARY OF THE INVENTION

The present invention relates to pneumatic devices. More particularly, the present invention relates to plugs used to block openings in manifolds or other pneumatic devices.

During the manufacturing of manifolds, passages are drilled or otherwise formed in the manifolds. Often, these passages have extraneous ports that must be blocked to prevent unwanted leakage. It is known to provide plugs that are positioned in these ports and held in place with adhesive or ultrasonic welding. According to the present disclosure, an alternative plug is provided to block such extraneous ports.

BRIEF DESCRIPTION OF THE DRAWINGS

A detailed description particularly refers to the accompanying figures in which:

FIG. 3 is a side elevation view of the plug body of FIG. 2;

FIG. 4 is an end elevation view of the plug body of FIG. 2;

FIG. 5 is a perspective view of the plug body of FIG. 2;

FIG. 6 is a cross-sectional view of the plug body taken along line 6-6 of FIG. 4.

FIG. 8 is a side elevation view of a plug body.

FIG. 9 is a partial fragmentary cross-sectional view of the manifold of FIG. 1 including the plug body illustrated in FIG. 8 with the plug body in a first position.

DETAILED DESCRIPTION OF THE DRAWINGS

Figure 1:
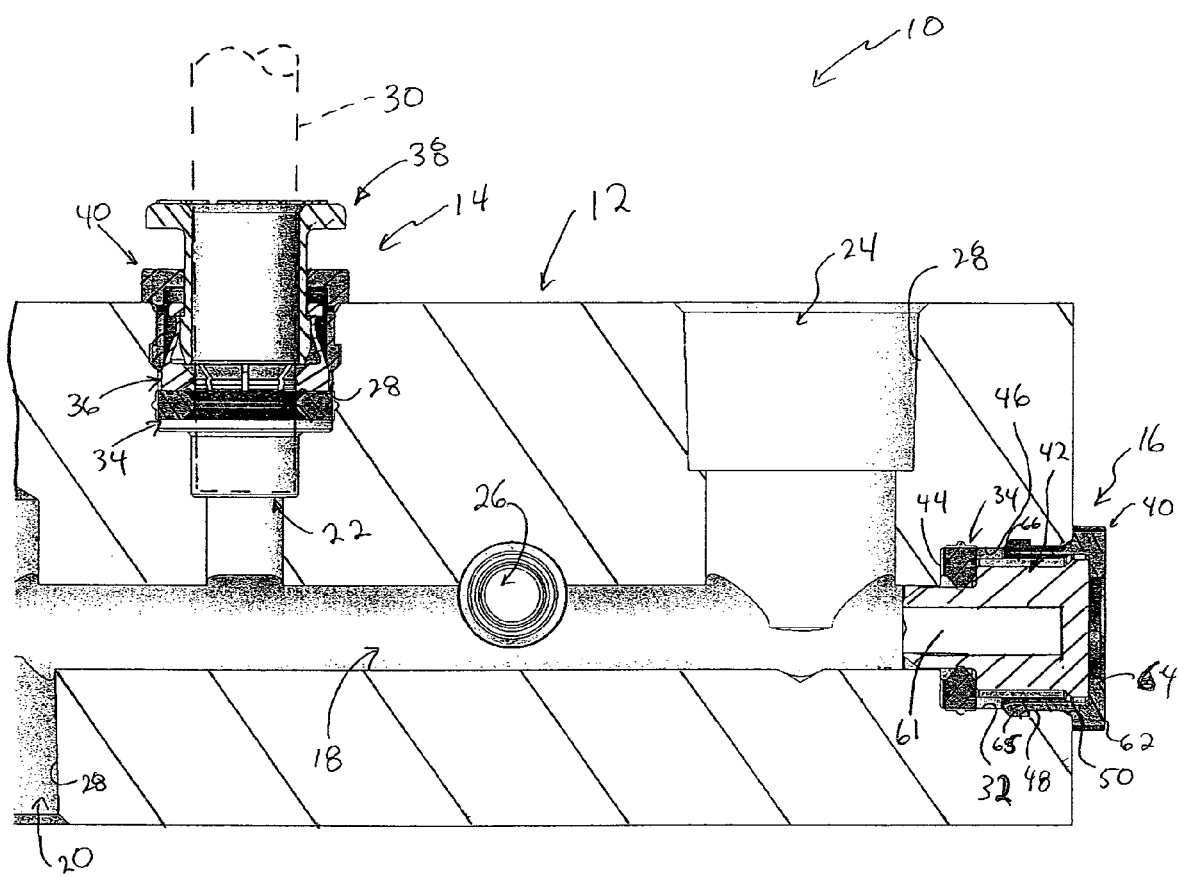
FIG. 1 is a cross-sectional view of a manifold showing the manifold including a manifold block, several passages formed in the manifold block, several ports leading to the passages, a fitting or cartridge positioned in one of the ports, a pneumatic tube (in phantom) received by the cartridge, and a plug positioned in another of the ports.

A portion of a manifold 10 is shown in FIG. 1 that includes an aluminum manifold body or housing 12, a fitting or cartridge 14, and a plug 16. Manifold body 12 is formed to include a main passage 18 and four branch passages 20, 22, 24, 26. Each branch passages 20, 22, 24, 26 includes a port 28 that receives a cartridge 14 (only one shown) for coupling with a pneumatic line or tube 30 (only one shown in phantom) or other fluid devices. Main passage 18 provides fluid communication between branch passages 20, 22, 24, 26 and the respective pneumatic lines 30 or other pneumatic devices. Additional details of suitable manifolds is provided in U.S. Patent Application Publication Nos. 2004/0003850, published Jan. 8, 2004, to Miyazoe et al.; and 2003/0226606, published Dec. 11, 2003, to Hayashi et al., the disclosures of which are expressly incorporated by reference herein.

Main passage 18 is formed by drilling into manifold body 12. Only a portion of resulting passage 18 is necessary to provide communication between branch passages 20, 22, 24, 26. For example, port 32 of passage 18 is not necessary to provide this communication. Port 32 is blocked or plugged with plug 16 to prevent air from escaping or entering passage 18.

According to the preferred embodiment, air is communicated through passages 18, 20, 22, 24, 26. According to alternative embodiments, other fluids such as water, oil, transmission fluid, oxygen, nitrogen, or other fluids that are communicated from one location to another.

Each cartridge 14 includes an annular packing seal 34 made of NBR (nitrile) rubber, an annular tube chuck 36 made of brass, a tubular chuck release or release button 38 made of POM (polyoxymethylene, polyacetal) plastic, and an annular guide or retainer 40 made of stainless steel or brass. According to alternative embodiments, a tube support is provided. According to alternative embodiments of the present disclosure, other materials known to those of ordinary skill in the art are used for the various components such as other plastic materials and other metals. Additional details of these components, their operation, and other alternative arrangements can be found in U.S. patent application Ser. No. 10/076,256, titled Pneumatic Coupling, to Pelfrey et al., filed Feb. 13, 2002, the disclosure of which is expressly incorporated by reference herein including the disclosure of U.S. Pat. Nos. 5,333,647; 5,459,953; 5,725,255; 6,062,260; and 6,131,610 also disclosing suitable cartridge arrangements.

Similar to cartridge 14, plug 16 also includes a packing seal 34 and a guide 40 substantially identical to packing seal 34 and guide 40 of cartridge 14. Plug 16 also includes a plug member 42 made of polypropylene. According to alternative embodiments of the present disclosure, the plug member is made of other materials such as other plastic materials, brass, stainless steel, other metals, and other materials known to those of ordinary skill in the art.

As shown in FIG. 1, port 32 includes a first shoulder 44, an annular surface 46 having an annular groove 48 formed therein, and a chamfer 50. During assembly, packing seal 34 is inserted into port 32 to a position adjacent shoulder 44. Packing seal 34 has an outside diameter that is slightly larger than the inside diameter of annular surface 46 so that seal 34 is slightly compressed by annular surface 46 and forms a seal therewith. Packing seal 34 is show in an uncompressed state in FIG. 1 to detail the difference in the uncompressed diameter of seal 34 relative to annular surface 46. The outside diameter of seal 34, when compressed by annular surface 46, is equal to the inside diameter of annular surface 46 when seal 34 is positioned in port 32.

During assembly, plug member 42 is inserted into port 32 and seal 34 as shown in FIG. 1. As shown in FIG. 3, plug member 42 includes a chamfered leading edge 52 that facilitates insertion of plug member 42 into seal 34, a first annular surface 54, a shoulder 56, a second annular surface 58, and a second shoulder or rim 60. As shown in FIG. 6, plug member 42 also includes a cavity 61 to reduce the material costs of plug member 42.

First annular surface 54 has an outside diameter that is slightly larger than the inside diameter of seal 34 so that seal 34 is slightly expanded by first annular surface 54 and forms a seal therewith. Packing seal 34 is shown in an unexpanded state in FIG. 1 to detail the difference in the unexpanded diameter of seal 34 relative to first annular surface 54 of plug member 46. The inside diameter of seal 34, when expanded by first annular surface 54, is actually equal to the outside diameter of annular surface 54 when plug member 42 is positioned in seal 34 and port 32. Because seal 34 is sealed with port 32 of manifold body 12 and plug member 42, port 32 is also sealed or plugged.

Figure 2:
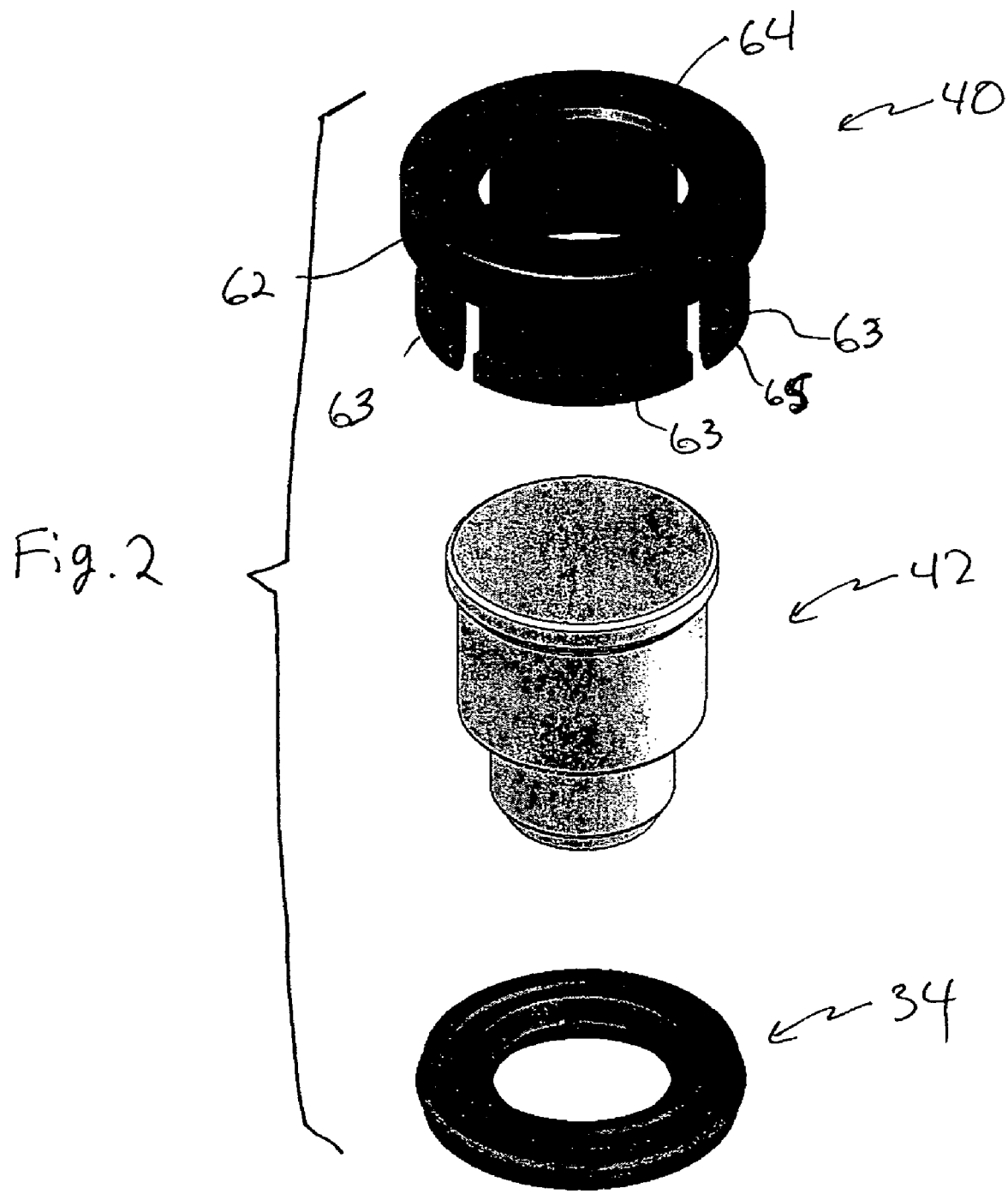
FIG. 2 is an exploded perspective view of the plug of FIG. 1 showing the plug includes a seal or packing, a plug body, and a guide or retainer.

As shown in FIG. 1, guide 40 retains plug member 42 and packing seal 34 in port 32. Guide 40 includes a plurality of tabs or fingers 63, an outer rim 62, and an inner rim 64 as shown in FIG. 2. Each finger 63 includes a lip or rim 65 that is sized to fit within annular groove 48 of port 32 as shown in FIG. 1. During assembly, guide 40 is inserted into port 32 during or after insertion of seal 34 and plug member 46. During this insertion, a chamfered leading edge 66 of fingers 63 slide over chamfer 50 and annular surface 46 of port 32 and fingers 63 bend or flex inwardly. When fully inserted rims 65 of fingers 63 snap into groove 48 as shown in FIG. 1 and inner rim 64 of guide 40 blocks plug member 46 from being removed. Shoulder 56 of plug member 46 blocks seal 34 from being removed.

Because guides 40 and seals 34 of plugs 16 and cartridges 14 are substantially identical, less tooling is necessary to than if these components were different. Thus, some of the same components are used for connecting and sealing tube 30 to manifold body 12 are used to plug extraneous port 30 to avoid additional tooling and other costs associated with providing different additional components.

According to the embodiment of FIG. 1, substantially identical seals 34 and identical guides 40 are provided on one manifold body 12. According to alternative embodiments of the present disclosure, cartridge 14 is provided on one pneumatic device and plug 16 is provided on another pneumatic device. Therefore, seal 34 is used to seal with a tube 30 on one pneumatic device and a substantially identical seal 34 is used to plug a passage in another pneumatic device. Similarly, guide 40 may be provided in a cartridge to couple a tube 30 on one pneumatic device and a substantially identical guide or retainer is used to plug a passage in another pneumatic device. Depending on the configuration of the pneumatic device, multiple cartridges 14 of the same or different size may be coupled to a housing or body of the pneumatic device. Similar, multiple plugs 42 of the same or different size may be provided on a housing to plug any number of different sized passages.

Figure 7:
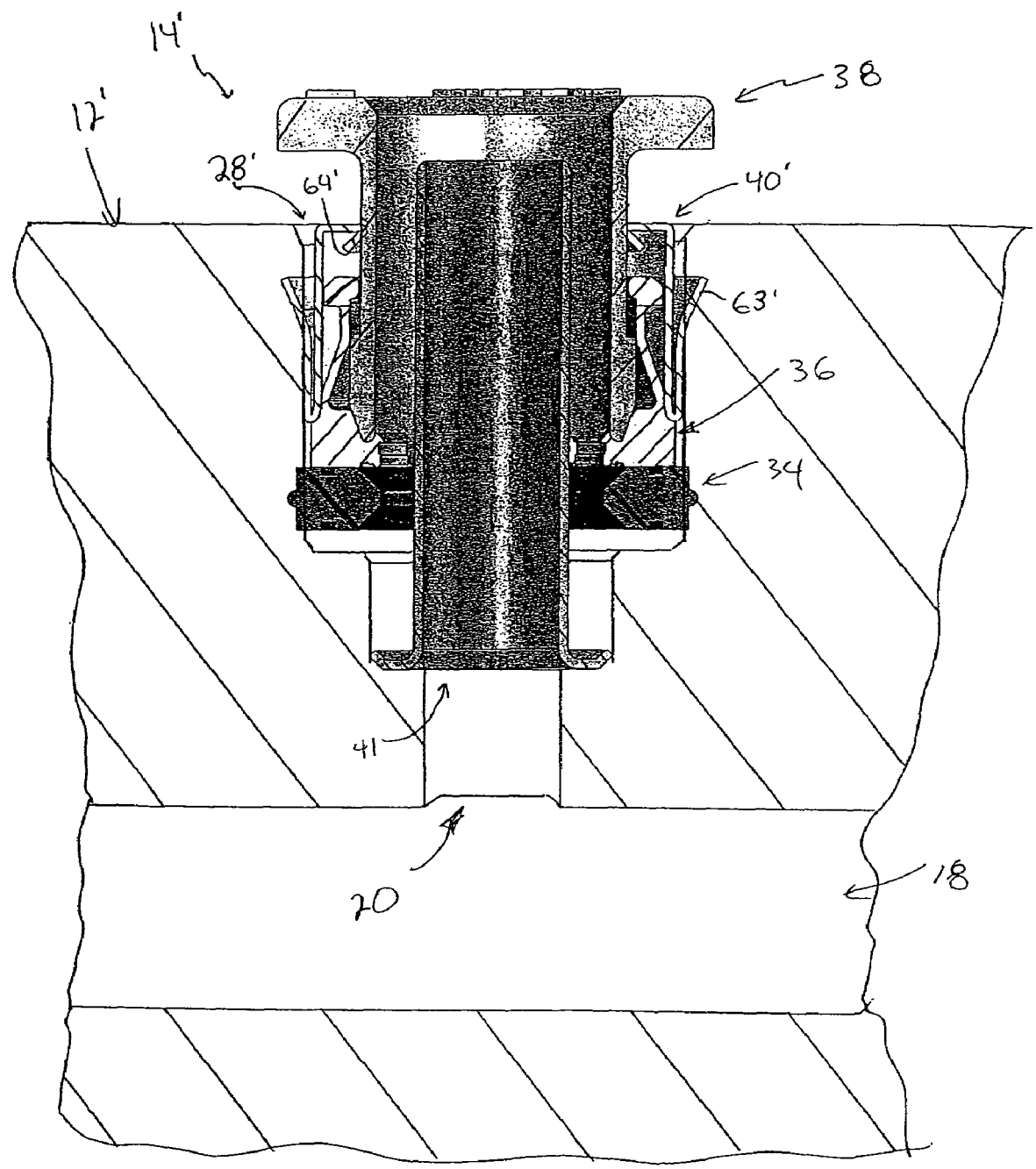
FIG. 7 is a cross-sectional view of an alternative embodiment fitting of cartridge.

An alternative embodiment cartridge 14' similar to cartridge 14 is shown in FIG. 7 for use with a manifold body 12' made of a composite material such as plastic of other synthetic material known to those of ordinary skill in the art. Illustratively, manifold body 12' includes a main passage 18 and a branch passage 20. Each cartridge 14' includes an annular packing seal 34, an annular tube chuck 36, a tubular chuck release or release button 38, and an alternative embodiment annular guide or retainer 40' made of stainless steel or brass, and a tubular tube support 41 made of brass. When cartridge 14' is inserted into a port 28' of manifold body 12', flanges 63' of guide 40' "bite" into the composite material of manifold body 12' to prevent cartridge 14' from being withdrawn. Similar to guide 40, guide 40' is segmented to define distinct flanges 63' that can flex inwardly.

Depending on the configuration of manifold body 12', extraneous ports (similar to port 28') may need to be plugged. For example, when main passage 18 is formed, an injector pin (not shown) needed to form passage 18 is withdrawn from main passage 18 through a port similar to port 32 of FIG. 1. If this port needs plugged, a plug (not shown) that includes seal 34, plug member 42, and retainer 40' is used to plug the port in a manner similar to plug 16 shown in FIG. 1. An inner rim 64' of retainer 40' blocks plug member 42 from being withdrawn from the port.

According to another alternative embodiment of the present disclosure, another plug is provided including seal 34, plug member 42, and a brass guide (not shown) that has a rib that "bites" into the composite material of the manifold body. Details of such a guide are provided in U.S. Pat. No. 6,578,879, filed Apr. 29, 1999, to Muto (see guide member 44), the disclosure of which is expressly incorporated herein by reference.

An alternative embodiment plug member 42' similar to plug member 42 of FIG. 3 is illustrated in FIG. 8. During assembly, plug member 42' is inserted into port 32 and seal 34 as shown in FIG. 9. As shown in FIG. 8, plug member 42' includes a chamfered leading edge 52' that facilitates insertion of plug member 42' into seal 34, a first annular surface 54', a shoulder 56', a second annular surface 58', and a second shoulder or rim 60'. As shown in FIG. 9, plug member 42' also includes a cavity 61' to reduce the material costs of plug member 42' as well as to provide a secure fit within port 32.

The plug 42' includes a securing rim 68 which is spaced longitudinally from the rim 60' with the annular surface 58' disposed therebetween. The securing rim 68 may be formed as part of the plug 42' as previously described for the plug 42 of FIG. 3. The annular surface 58' has a length 70 which is less than the length of the annular surface 58 of plug 42 as illustrated in FIG. 3. In addition, the overall length 72 of the plug 42' is less than the overall length of the plug 42 of FIG. 3.

Referring now to in FIG. 9, the plug member 42' may be inserted into the port 32 after which the guide 40 is inserted. When the guide 40 is inserted, the chamfered leading edge 66 of fingers 63 slide over chamfer 50 and annular surface 46 of port 32 and fingers 63 bend or flex inwardly. When fully inserted rims 65 of fingers 63 snap into groove 48 as shown in FIG. 9.

The plug member 42', after insertion of the guide 40, may be spaced from the bottom of the guide 40 thereby creating a void 74 between and bottom portion 76 of the inner rim 64 and a top surface of the plug 42'. In this position, the securing rim 68 is positioned away from and in non-contacting relation with the fingers 63 of the of guide 40.

Figure 10:
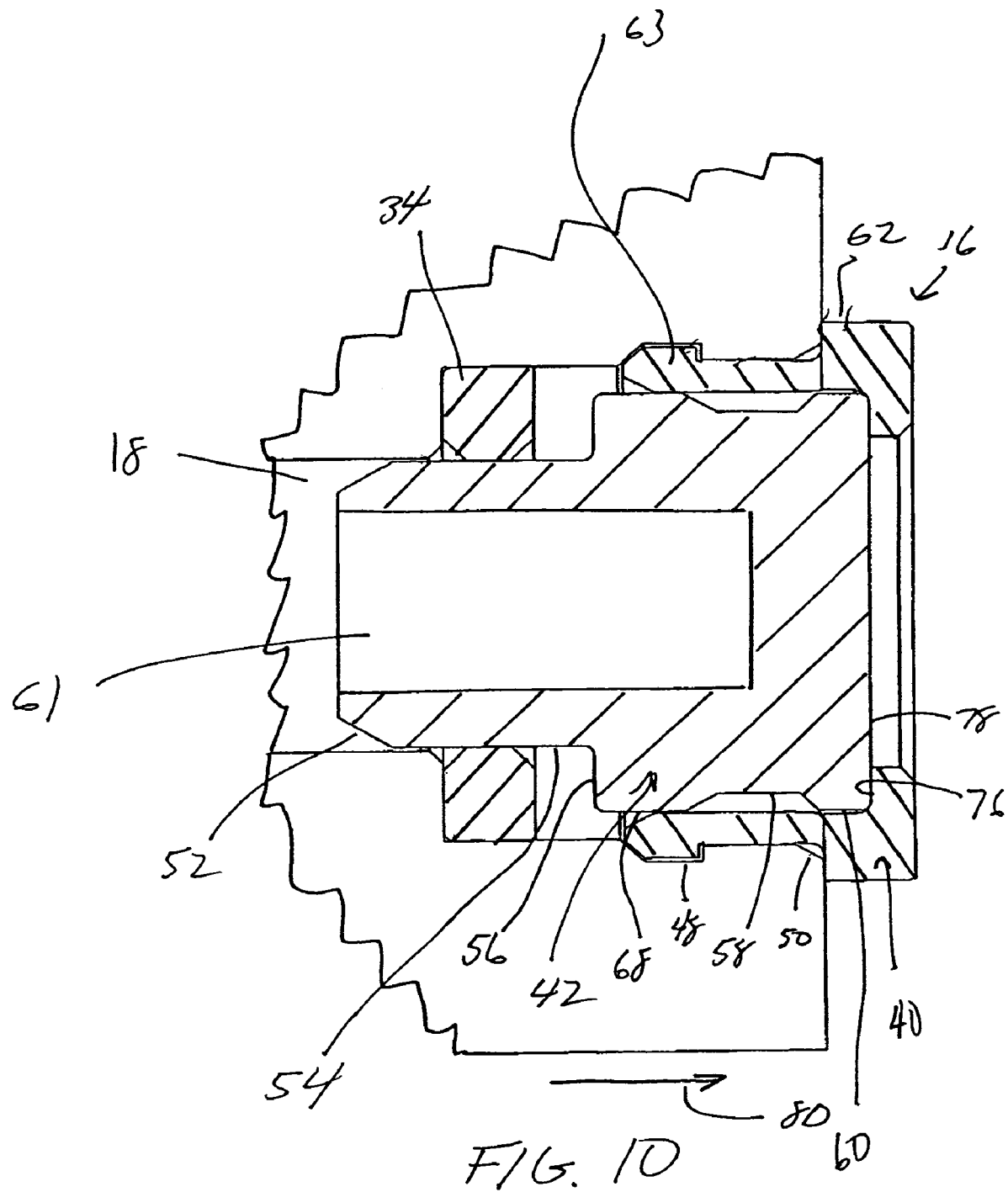
FIG. 10 is a partial fragmentary cross-sectional view of the manifold of FIG. 1 including the plug body illustrated in FIG. 8 with the plug body in a second position.

As illustrated in FIG. 10, once the fluid pressure is applied to the manifold, the fluid moving into contact with and impacting the surface defining the cavity 61 causes the plug member 46' to move in a direction 80 such that the surface 78 of the plug member 46' contacts the bottom portion 76 of the inner rim. In addition, since the plug member 46' has moved in the direction 80, the securing rim 68 is moved into contact with the fingers 63. The rims 65 of the fingers 63 become located in the groove 48 to thereby hold the guide 40 in place. In those instances where the plug member 46' comprises an elastic material, some expansion of the cavity 61 may occur under fluid pressure. The outer surface of the plug member 46' may expand to apply a pressure to the fingers 63 to thereby secure the guide 40.

If the plug member 46' must be removed, for instance to connect the pneumatic line or tube 30 to the port 32, fluid pressure within the manifold body 12 is reduced and the fluid may be drained from the main passage 18 and branch passages 20, 22, 24, and 26. Since the fluid pressure no longer impacts the interior walls of the cavity 61, the guide 40 may be removed to provide for removal of the plug member 48'. After removal of the plug member 48', the guide 40 may be reinserted into the port 32 to enable the connection of the pneumatic line or tube 30 as previously described.

Although the invention has been described in detail with reference to certain preferred embodiments, variations and modifications exist within the scope and spirit of the present invention.

The invention claimed is:

1. A fluid device for
a housing including an inner surface defining a groove and an interior region having a first passage configured to communicate a fluid from one location in the housing to another location in the housing and a second passage in fluid communication with the first passage, comprising:
an elastic seal adapted to be positioned adjacent the inner surface of the housing to block leakage of fluid between the elastic seal and the inner surface,
a plug member, including a cavity to receive the fluid, the plug member adapted to be positioned adjacent the elastic seal to block leakage of the fluid between the plug member and the elastic seal, wherein the plug member includes a securing rim spaced from an end of the plug member, and
a retainer, to retain the plug member within the housing, the retainer including finger having a rim, the retainer also including a cavity to receive the plug member, wherein the securing rim of the plug member is configured to contact the finger to hold the rim to the groove 01 the housing.

2. The fluid device of claim 1, wherein the retainer comprises a flexible material.

3. The fluid device of claim 2, wherein the securing rim includes a dimension less than a dimension of the first passage, to enable the plug member to fit within the first passage.

4. The fluid device of claim 3, wherein the rim of the retainer includes a dimension greater than the dimension of the securing rim of the plug member, to prevent removal of the plug member from the first passage.

5. The fluid device of claim 1, wherein the cavity of the plug member is cooperatively disposed adjacent the securing rim, to receive the fluid whereby fluid pressure holds the securing rim against the finger.

6. A fluid device, comprising:
a housing including an inner surface that defines an interior region having a first passage configured to communicate a fluid from one location in the housing to another location in the housing and a second passage in fluid communication with the first passage, the inner surface including a groove,
a plug member positioned to block leakage of fluid from the second passage, the plug member including a securing rim spaced from an end of the plug member, the securing rim being disposed at the groove of the inner housing to secure a retainer to the housing, and
the retainer including a flexible material and a finger adapted to hold the retainer to the housing by being received by the groove, the retainer positioned to couple the plug member to the housing, wherein the securing rim contacts the finger of the retainer and wherein the plug member includes a cavity cooperatively disposed adjacent the securing rim, to receive the fluid whereby fluid pressure holds the securing rim against the finger.

7. The fluid device of claim 6, wherein the plug member comprises a rim having a dimension less than a dimension of the first passage, to enable the plug member to fit within the first passage.

8. The fluid device of claim 7, wherein the retainer comprises an inner rim, the inner rim having a dimension greater than the dimension of the rim of the plug member, to prevent removal of the plug member from the first passage.

9. The fluid device of claim 1, wherein the plug member includes an inner surface, to enable the fluid to move the plug member to secure the retainer to the housing.

10. A fluid device comprising:
a housing including an inner surface that defines an interior region having a first passage configured to communicate a fluid from one location in the housing to another location in the housing and a second passage in fluid communication with the first passage, wherein the inner surface of the housing comprises a groove,
an elastic seal positioned adjacent the inner surface of the housing to block leakage of fluid between the elastic seal and the inner surface,
a plug member positioned adjacent the elastic seal to block leakage of fluid between the plug member and the elastic seal, the plug member including a cavity and a securing rim spaced from an end of the plug member, the cavity cooperatively disposed adjacent the securing rim and the securing rim being disposed at the groove of the inner housing to secure a retainer to the housing,
wherein the retainer is positioned adjacent the plug member, to retain the plug member within the housing, wherein the retainer comprises a finger, adapted to hold the retainer to the housing when received in the groove and wherein the securing rim contacts the finger of the retainer and the cavity is adapted to receive the fluid whereby fluid pressure holds the securing rim against the finger.

11. The fluid device of claim 10, wherein the retainer comprises a flexible material.

12. The fluid device of claim 11, wherein the securing rim includes a dimension less than a dimension of the first passage, to enable the plug member to fit within the first passage.

13. The fluid device of claim 12, wherein the rim of the retainer includes a dimension greater than the dimension of the securing rim of the plug member, to prevent removal of the plug member from the first passage.

14. The fluid device of 13, wherein the cavity of the plug member is cooperatively disposed adjacent the securing rim, to receive the fluid whereby fluid pressure holds the securing rim against the finger.

* * * * *